US 6,669,759 B1

(12) United States Patent
Kutyev et al.

(10) Patent No.: US 6,669,759 B1
(45) Date of Patent: Dec. 30, 2003

(54) METHOD FOR REGENERATING ACTIVATED CARBON AND DEVICE FOR CARRYING OUT SAID METHOD

(75) Inventors: Anatoly A Kutyev, Moscow (RU); Vladimir Matveevich Zlotopolsky, Moscow (RU); Arkady Samuilovich Guzenberg, Korolev (RU); Dmitry Anatolyevich Krychenkov, Moscow (RU); Sergei Ivanovich Eremeev, Moscow (RU)

(73) Assignee: Kutyev Anatoly Anatolyevich, Moscow (RU)

( * ) Notice: Subject to any disclaimer, the term of this patent is extended or adjusted under 35 U.S.C. 154(b) by 0 days.

(21) Appl. No.: 10/275,452

(22) PCT Filed: Oct. 4, 2000

(86) PCT No.: PCT/RU00/00398

§ 371 (c)(1),
(2), (4) Date: Nov. 4, 2002

(87) PCT Pub. No.: WO01/83245

PCT Pub. Date: Nov. 8, 2001

(30) Foreign Application Priority Data

May 4, 2000 (RU) ........................................ 2000110793

(51) Int. Cl.⁷ ................................................ B01D 53/04
(52) U.S. Cl. .............................. 95/115; 95/143; 95/148
(58) Field of Search ........................... 95/99, 106, 111, 95/112, 115, 120, 125, 141, 143–148; 96/122, 126–133, 143, 145, 146

(56) References Cited

U.S. PATENT DOCUMENTS

| | | | |
|---|---|---|---|
| 3,661,200 A | | 5/1972 | McNamara |
| 5,542,965 A | * | 8/1996 | Straubinger et al. ............ 95/14 |
| 5,695,546 A | * | 12/1997 | Izumi et al. .................. 95/115 |
| 5,702,505 A | * | 12/1997 | Izumi et al. .................. 95/115 |
| 5,968,235 A | * | 10/1999 | Grime et al. .................. 95/123 |
| 6,319,303 B1 | * | 11/2001 | Guillard et al. ................ 95/97 |
| 6,428,608 B1 | * | 8/2002 | Shah et al. ................... 95/123 |
| 6,458,185 B1 | * | 10/2002 | Reiter et al. .................. 95/115 |
| 2002/0124727 A1 | * | 9/2002 | Hauck ......................... 95/148 |

FOREIGN PATENT DOCUMENTS

| | | |
|---|---|---|
| DE | 3318025 | 11/1984 |
| FR | 2069486 | 9/1971 |
| RU | 2093372 | 10/1997 |
| SU | 770859 | 10/1980 |

* cited by examiner

*Primary Examiner*—Robert H. Spitzer
(74) *Attorney, Agent, or Firm*—Dellett & Walters

(57) ABSTRACT

Methods for regenerating activated carbon mainly used in air-treating devices in transportation, in particular for passenger compartments in transportation conveyances. The invention can be also used for regenerating activated carbon for air-treating devices in other areas. The method for regeneration of activated carbon comprises a regeneration, which is performed with the help of water vapor obtained from condensate of humidity in the atmosphere. The condensate is pre-adsorbed on silica gel during air cleaning. The regeneration is carried out at the atmospheric pressure, at a temperature of up to 160° C. followed by cooling with the help of the fan with an air flow of no less than 25 min⁻¹.

2 Claims, No Drawings

METHOD FOR REGENERATING ACTIVATED CARBON AND DEVICE FOR CARRYING OUT SAID METHOD

FIELD OF ART

This invention relates to methods and devices for regenerating activated carbon mainly used in air-treating devices of means of transport, in particular in their passenger compartments. However it can be also used for regeneration of activated carbon for air-treating devices in other areas. There are known a method for thermal vacuum regeneration of activated carbon and a device for carrying out the method (L. S. Bobe, Yu. E. Sinyak, A. A. Berlin, V. A. Soloukhin. Ecological and technical systems. M.: MAI publishing house, 1992, page 38).

Their drawback is the complexity as the process is conducted with simultaneous heating of a sorption cartridge to 200° C. with vacuuming. Furthermore, when using this method, a long time is required for sorbent cooling due to lack of forced heat removal.

The most similar to this invention are a device and a method for regenerating activated carbon with live steam at an elevated pressure of 1.4–1.6 to 8–9 atmospheres. This method is widely used for desorption of vapor of various organic compounds, for example, vapor of benzene, vapor of ethyl and methyl alcohol, vapor of acetone and a number of other compounds (E. N. Serpionova. Adsorption of vapor and gases in industry. 1969, p. 193–202).

Their drawback is the necessity to have in stock waste live water steam, which can be available at an industrial enterprise only. Furthermore, when using this method for regeneration of activated carbon, subsequent prolonged drying and cooling of sorbent is required. Another drawback of this method is its carrying out at an elevated pressure, which imposes additional requirements upon separate components of the device.

DISCLOSURE OF THE INVENTION

The technical result of the invention is the development of a method for regeneration of activated carbon and a device for carrying out the method at an atmospheric pressure with the aid of humidity in the atmosphere, which affords quick cooling of sorbent.

The technical result is achieved due to the fact that during air cleaning of harmful impurities, in the method for regenerating activated carbon, mainly in air-treating devices for the passenger compartments of means of transport, consisting in that regeneration is performed with the aid of water vapor, condensate of atmospheric humidity pre-adsorbed on silica gel during air cleaning is used as a source of water vapor, the regeneration is carried out at an atmospheric pressure, with heating to a temperature of 160° C. followed by cooling with the aid of a fan with an air flow of no less than 25 $min^{-1}$.

In this case a silica gel-activated carbon volume ratio is selected to be within 0.4 to 1.1.

The device for carrying out the method for regenerating activated carbon with the help of water vapor comprises a sorption cartridge wherein silica gel and activated carbon are placed, a heating element for heating the sorption cartridge during regeneration and a fan connected to the sorption cartridge for its cooling and for emitting regeneration products into the atmosphere.

Furthermore, silica gel-activated carbon volume ratio in a sorption cartridge is 0.4–1.1.

Furthermore, a heater is designed so that the sorption cartridge can be heated to 160° C., and the fan is designed to have an air flow of no less than 25 $min^{-1}$.

The features are essential and interconnected by cause-and-effect relation with formation of a combination of essential features sufficient to achieve the technical result.

This invention is exemplified by a particular embodiment, which however is not the only possible one but it explicitly shows the possibility to achieve the specified technical result with this combination of the essential features.

THE BEST EMBODIMENT OF THE INVENTION

The method for regenerating activated carbon, mainly used in air-treating devices for the passenger compartment of means of transport, consists in adsorption of water vapor contained in condensate of atmospheric humidity on silica gel. During regeneration of activated carbon the both sorbents, whose volume ratio is strictly specified, are pre-heated to 160° C., the heating element is switched off and the fan is switched on at the air flow, with a ratio of its volume flow to total volume of sorbents being no less than 25 $min^{-1}$.

When the sorbents are heated to 160° C., an active release of humidity from silica gel takes place. As a consequence it penetrates into internal pores of silica gel and forces molecules of organic compounds out of them. These molecules are forced out into the gas space surrounding the sorbent. This process goes on at a temperature of up to 160° C., and further elevation of temperature does not result in higher efficiency of regeneration process. After switching off the heating element and switching on the fan the vapor-gas mixture is removed from the filter by the air with a flow of no less than 25 $min^{-1}$, resulting in quick forced heat removal. During regeneration an outlet of the sorption cartridge is connected to atmospheric air, hence the atmospheric pressure is maintained. Therefore additional requirements are not imposed upon separate components of the device as to air-tightness, which represents an advantage of these method and device for regenerating activated carbon.

Using the atmospheric humidity in regeneration of activated carbon makes it possible to apply these method and device in air cleaning systems located in various areas, for example, in production areas, passenger compartments of vehicles and planes, in special hermetical areas where a special source of water vapor is lacking.

In regeneration the ratio of silica gel and activated carbon plays an important part. With insufficient quantity of silica gel a volume of the condensate of atmospheric humidity, which can be adsorbed by silica gel, is insufficient for complete regeneration of activated carbon. On the other hand, the use of too large volume of silica gel results in release of excessive amount of humidity, which does not increase an extent of regeneration but necessitates an additional drying of activated carbon. The optimum silica gel-activated carbon volume ratio is 0.4–1.1. An extent of regeneration of 81–84% is achieved within this range.

The use of forced ventilation after heating the sorbent to 160° C. and switching off the heating element enables quick and efficient removal of vapor and gas mixture together with desorption products from the filter and quick cooling of sorbent, which makes it possible to reuse activated carbon with small time intervals between sorption and desorption processes. In this case the air flow should be no less than 25 $min^{-1}$, otherwise regeneration efficiency is impaired due to the fact that reverse processes, that is adsorption of desorbed harmful impurities, partially would take place.

The method is proved by way of a particular example.

In the air-treating device, in the passenger compartment of a means of transport the air with a flow of 10 m$^3$/hour, containing hexane vapor with a concentration of 23 mg/m$^3$ is fed for cleaning into the sorption cartridge containing silica gel and activated carbon. A volume of silica gel in the cartridge is 615 cm$^3$, a volume of activated carbon is 775 cm$^3$, a volume ratio of sorbents is 0.79. The humidity contained in the atmospheric air is sorbed on silica gel, whereas hexane is removed by activated carbon. After the sorption process, which lasts about 4 hours, the sorbents are subjected to regeneration. For this purpose they are heated to 160° C. In this case the device outlet is connected to the atmosphere, making it possible to carry out the process at an atmospheric pressure. After attaining a temperature of 160° C., the heater is switched off, and the fan with the air flow of 120 min$^{-1}$ is switched on. Hexane adsorbed on activated carbon is forced out by water vapor desorbed from silica gel and discharged together with it into the atmosphere.

In this case the regeneration efficiency is 82%, and the time of activated carbon cooling to a normal temperature is 20 minutes.

Industrial Applicability

This invention meets the "industrial applicability" criterion since it can be embodied with the use of the known materials, means of production and methods.

The inventive method of activated carbon regeneration, mainly in air-treating devices in the passenger compartments of means of transport, which consists in adsorption of water vapor contained in the condensate of atmospheric humidity on silica gel, makes it possible to utilize the humidity contained in the atmosphere and carry out quick cooling of the sorbent.

What is claimed is:

1. A method for regenerating activated carbon, mainly in air-treating devices used in passenger compartments of means of transport, which consists in regeneration performed with the aid of water vapor and differs in using the condensate of atmospheric humidity pre-adsorbed on silica gel during air cleaning as a source of water vapor, the regeneration is performed at the atmospheric pressure with heating to a temperature of 160° C. followed by cooling with the help of a fan with an air flow of no less than 25 min$^{-1}$.

2. The method according to claim 1 differing in that a volume ratio of silica gel-activated carbon is selected to be within 0.4–1.

* * * * *